United States Patent [19]

Amelot et al.

[11] Patent Number: 4,485,677

[45] Date of Patent: Dec. 4, 1984

[54] DEVICE FOR TENSIONING PRE-STRESS BARS AND FOR DETERMINING THIS TENSION

[75] Inventors: Bernard Amelot, Epernon; Jean Ducreux, Champignys, both of France

[73] Assignee: Freyssinet International (STUP), Boulogne-Billancourt, France

[21] Appl. No.: 385,293

[22] Filed: Jun. 4, 1982

[30] Foreign Application Priority Data

Jun. 9, 1981 [FR] France ............................... 81 11305
Jan. 11, 1982 [FR] France ............................... 82 00295

[51] Int. Cl.[3] ............................................... G01L 5/00

[52] U.S. Cl. .................................. 73/761; 73/862.54; 254/29 A

[58] Field of Search ................ 73/761, 862.62, 862.54; 254/29 A

[56] References Cited

U.S. PATENT DOCUMENTS 2,889,729 6/1959 Orner .................................. 73/761
3,242,725 3/1966 Carrie .................................. 73/761
3,858,846 1/1975 Schmid ............................ 254/29 A
3,943,819 3/1976 Charron ............................... 73/761

FOREIGN PATENT DOCUMENTS 2060186 4/1981 United Kingdom .................. 73/761

*Primary Examiner*—Anthony V. Ciarlante
*Attorney, Agent, or Firm*—Ned L. Conley; David Alan Rose; William E. Shull

[57] ABSTRACT

A swiveling device for tensioning a pre-stress bar having a threaded end projecting from an end face of the element to be pre-stressed comprises a jack having a movable part attached to the bar and a fixed part bearing against the element. A first bearing plate is mounted on the end face of the element around the bar and includes an annular spherical cup surface. A swivel joint nut is threaded on the end of the bar and has a spherical ball part seated in the cup surface of the first bearing plate forming a first swivel joint. A second bearing plate is slidably disposed on a face of the first bearing plate and includes a second annular spherical cup surface. The end of the fixed part of the jack proximate the element includes a spherical surface seated in the second annular spherical cup surface forming a second swivel joint.

10 Claims, 3 Drawing Figures

DEVICE FOR TENSIONING PRE-STRESS BARS AND FOR DETERMINING THIS TENSION

The present invention relates to a swiveling device for tensioning pre-stress bars.

With a particular view to pre-stressing concrete elements of small dimensions, it is known that short steel bars embedded in such elements and with threaded ends protruding therefrom can be placed in tension and the tension maintained by means of nuts threaded on the ends of the tensioned bars and bearing on the end faces of the element from which the ends of these bars emerge. It is also known that in order to obtain correct bearing orientation of each nut against the outer face of the element, the part of the nut turned towards the outer face of the element is shaped as a swivel joint ball and cooperates with an annular cup disposed, around the bar and against the outer face of the element. In this way are compensated the slight constructional imperfections which cause slight errors of orientation (generally less than five degrees) of the axis of the bar with respect to the perpendicular to the outer face of the concrete element.

However, even with smaller errors of orientation, for example of three degrees at the most, the jack for tensioning the bar operates under incorrect conditions since it is not coaxial with the bar.

It is an object of the present invention to remedy this drawback and in addition, to allow a very precise assessment of the value of the tension imposed on the bar, either during its first tensioning or during subsequent checks of this tension.

According to the invention, the apparatus for tensioning a pre-stress bar for a concrete element comprises a movable part attached to said bar, a swivel joint ring disposed around said bar on the outer face of said element, said ring being movable in all directions on said outer face of said element with respect to said bar, and a fixed part bearing against said swivel joint ring. The swivel joint ring and fixed part have cooperating, relatively slidable spherical surfaces.

The swivel joint ring is preferably in the form of a cup and the end of said fixed part is preferably in the form of a portion of swivel joint ball.

The center of the cooperating spherical surfaces also preferably coincides substantially with the point of fixation of the bar on the movable part of said apparatus.

To obtain correct positioning of the fixed part of the tensioning apparatus against the swivel joint ring, virtually automatically, the bearing surface against which the swivel joint ring rests comprises a smooth, plane, possibly lubricated plate.

In this way, the swivel joint ring receiving the fixed part of the tensioning apparatus is spontaneously centered with respect thereto so as to cancel any asymmetrical bearing reaction forces of said fixed part against said ring.

Due to the invention, which causes the apparatus for tensioning the bar to become coaxial with the bar, a tension may be applied to the bar and the bearing swivel joint nut may be screwed into contact with the swivel joint cup which is part of the bearing plate attached to the face of the element in order to transmit the tension in the bar to the concrete element. The apparatus may then be released.

In the event a hydraulic jack is used, it is then possible to know exactly the tension imparted to the bar when the swivel joint nut has been screwed, or to check the behaviour of the bar in operation.

In fact, when the jack, connected to the bar end projecting from the nut, is progressively brought under pressure, first it elastically lengthens the portion of bar between the swivel joint nut and the point of attachment of this bar on the jack, then, when the tension reaches that of the bar, the bearing swivel joint nut begins to detach from the cup made in the plate which bears against the end face of the concrete element and the whole of the bar lengthens.

Under these conditions, if the elongation of the bar between a fixed reference position and a reference position connected to the swivel joint nut is measured as a function of the increasing hydraulic pressure imposed on the jack, a slight elongation is observed at first, as a function of this pressure increase, then a considerable elongation is observed, both elongations being linear, since both of such elongations are elastic. The value of the pressure at the connecting angle of the two straight lines gives the value of the real tension in the bar when the nut returns into abutment in its cup.

In an advantageous embodiment which reduces the weight and bulk which are detrimental when the threaded bars are intended for reinforcing a complex construction comprising, for example, a plurality of closely located frames, and which avoids the use of a complementary section of threaded bar to extend the bar to be tensioned and anchored, the traction apparatus being a hydraulic jack with annular piston, said piston bears directly against the swivel joint ring, and the threaded bar extends through the head of the cylinder, and bears against the cylinder head by means of a nut threaded on the free end of the bar.

The cylinder head preferably comprises a central recess for partially housing this nut, which further reduces the axial length of the whole apparatus.

As the stroke of the piston in its cylinder is relatively short, in order to avoid the risks of jamming the piston, the piston is in the shape of a hollow annular cylinder and the inner and outer peripheries of this cylindrical piston are tapered in the form of portions of toric surfaces substantially from the surface of the piston receiving the hydraulic pressure.

The invention will be more readily understood on reading the following description with reference to the accompanying drawings, in which.

Figure 1:
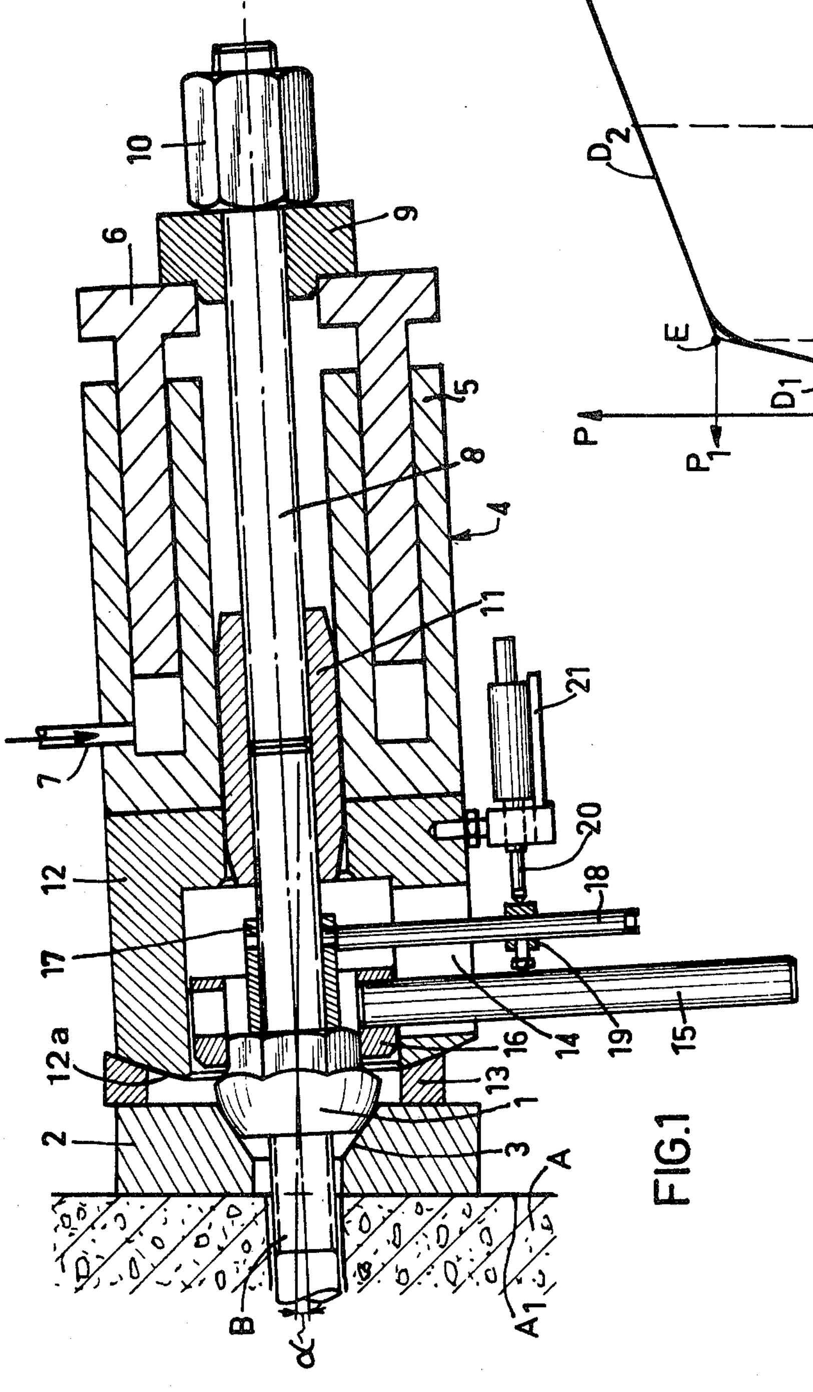
FIG. 1 is a section through a tensioning and tension-measuring device according to the invention.

Referring now to the drawings, FIG. 1 shows the concrete element A which is pre-stressed by the tensioned bar B whose axis makes a small angle $\alpha$ with the perpendicular to the outer face $A_1$ of this element.

The threaded bar B is tensioned and its tension is maintained by the swivel joint nut 1 bearing on a bearing plate 2 provided to this end with a cup 3.

The tension of the bar is imposed by a jack 4 whose fixed cylinder 5 bears on the element A, while the piston 6 is mobile under the action of pressurised oil, supplied through the nozzle 7.

Connection of the piston 6 with the bar B is ensured by a section of threaded bar 8, due to the threaded sleeve 11, the bearing ring 9 and the nut 10.

According to the invention, the bearing of the cylinder 5 against the element A is not direct, but is ensured by a section of cylinder 12 terminated by a spherical head 12*a* which bears on a swivel joint ring in the form of a swivel joint cup 13, which may slide freely against the plate 2. In this way, by the spontaneous displacement of this ring 13 against the plate, the axis of the jack merges with that of the bar without risk of flexion thereof by reason of the direction of concavity of the cup and the position of the center of the spherical part thereof, said center being close to the point of fixation of the bar on the jack.

After the bar tensioned, an opening 14 made in the cylinder 12 makes it possible, by means of a pin 15, to maneuver the tube wrench 16 engaged on the hex nut 1.

To know the exact tension of the bar after the nut has been tightened, the procedure is as follows:

On the bar, in contact with the nut, is engaged a section of tube 17 in which is transversely fixed a rod element 18 emerging through an opening 14. A cursor 19 fixed on this rod is in contact with the mobile point 20 of a comparator 21 with dial, which is fixed by a collar to the bearing cylinder 12, i.e. the fixed part.

Figure 2:
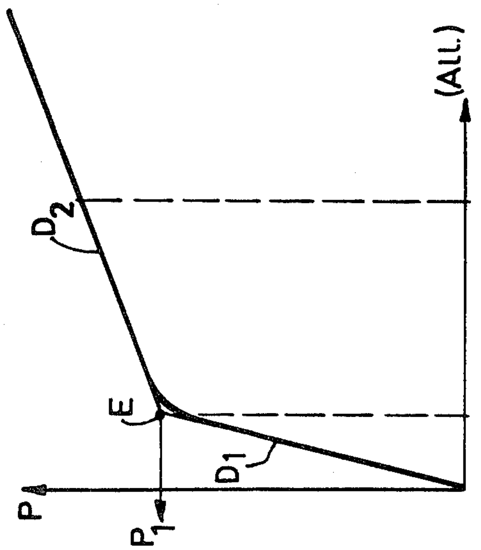
FIG. 2 is a diagram of the elongation of the bar shown in FIG. 1 as a function of the hydraulic pressure admitted in the jack.

The hydraulic pressure in the jack having been released, this pressure (P), on the x-axis in the diagram of FIG. 2, is progressively increased. In this way, the jack first elastically elongates the portions of bar B and bar 8 included between nuts 1 and 10 (which, as a function of elongation (AL), makes it possible to plot the portion of straight line $D_1$), then the whole bar B and bar 8, as soon as the nut 1 has detached from the bearing cup, which corresponds to straight line $D_2$.

The point of intersection E of these two straight lines, each plotted by at least two points, determines the pressure $P_1$ in the jack which corresponds very substantially to the tension of the bar B.

If the bar B is maintained sufficiently long, this operation may be repeated whenever a check of the tension of the bar B appears necessary.

The invention is applicable to all constructions prestressed by bars with threaded ends and especially to transversely pre-stressed beam frames.

Figure 3:
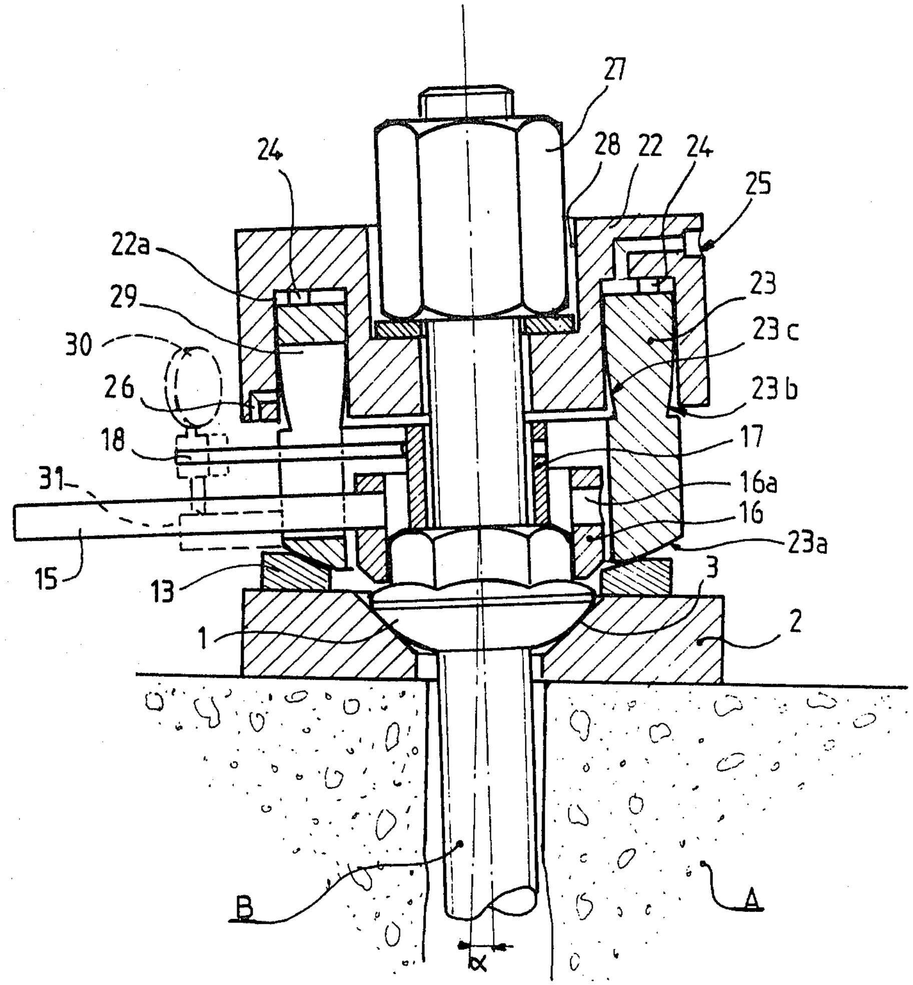
FIG. 3 shows in axial section an advantageous embodiment of the jack according to the invention.

In the embodiment shown in FIG. 3, the tensioning jack includes a cylinder 22, comprising an annular chamber 22*a*, and a likewise annular piston 23, comprising O-rings (not shown) and stroke limiting stops such as 24 allowing operation of the jack supplied by the intake of pressurised liquid 25. A vent 26 limits the stroke of the jack by allowing escape of the oil when the admissible stroke is reached. The outside of the bar B is sufficiently long to bear on the cylinder head of the jack by a nut 27.

Dimensions may be reduced, as shown, by arranging a depression 28 at the center of the cylinder head, for partially housing this nut 27.

As in the case of FIGS. 1 and 2, when the jack is under pressure and the bar B elongated, the nut 1 is maintained in abutment against the cup 3 by the rotation of the tube wrench 16 maneuvered by the pin 15 through a window 29 made in the piston 23. The angular opening of this window is sufficient to allow the pin 15, after rotation, to pass from a hole 16*a* in the tube wrench to the following hole therein. The opening 29, for example of 50°, enables a wrench 16 comprising eight radial holes to be easily maneuvered.

The piston 23 comprises, at its free end, a spherical surface 23*a* which bears against the swivel joint ring 13, which may slide on the bearing piece 2.

As the traction stroke of the jack is very short, the piston risks being jammed in the cylinder at the slightest inclinations of one with respect to the other. To avoid this risk, the outer surfaces of the piston, from the active surface thereof, are tapered in the form of portions of toric surfaces 23*b* and 23*c*. In this way, the piston may pivot slightly in the cylinder without adversely affecting its operation.

As in the case of FIGS. 1 and 2, a section of tube 17, carrying a radial rod 18 emerging through the opening 29 and supporting a comparator 30 with dial, makes it possible, by the key of this comparator bearing on a member (shown schematically at 31) mounted on the piston 23 (fixed part of the jack), to determine the value of the tension in the bar B).

An important advantage of this embodiment is the lightness of the whole apparatus which must be able to be carried by hand and easily manipulated.

It is more particularly applicable to the tensioning of short bars in complex constructions in which access to these bars, for tensioning thereof, is difficult.

What is claimed is:

1. In a device for tensioning a bar having an axis and embedded in an element to be pre-stressed and having a threaded end projecting from an end face of said element, a traction apparatus having an axis and a movable part attached to said rod and a fixed part, said fixed part having one end proximate said element, a first bearing plate mounted against said end face and having a first annular spherical cup part, a nut engaged on said threaded end and having a first spherical ball part bearing against said first annular spherical cup part thereby forming a first swivel joint, the improvement in said device comprising a second bearing plate slidably disposed on an outer face of said first bearing plate, said second bearing plate having a second annular spherical cup part, said one end of said fixed part having a second spherical ball part bearing against said second annular spherical cup part of said second bearing plate, thereby forming a second swivel joint for permitting the axis of said traction apparatus to become substantially coaxial with the axis of said bar upon said traction apparatus applying tension on said bar.

2. The device of claim 1, wherein the center of the cooperating spherical surfaces of said second annular spherical cup part and said second spherical ball part of said one end of said fixed part of said traction apparatus coincides substantially with the point of attachment of said bar to said movable part of said traction apparatus.

3. The device of claim 1, wherein the outer face of said first bearing plate on which said second bearing plate is slidably disposed comprises a plane, smooth surface.

4. The device of claim 3, wherein said plane, smooth surface is lubricated.

5. The device of claim 1, wherein the traction apparatus comprises a hydraulic jack having an annular piston, said piston constituting said fixed part of said traction apparatus and bearing directly against said second bearing plate.

6. The device of claim 5, said jack further including a cylinder head, and wherein said threaded end of said bar extends through said cylinder head, there being a second nut threaded on the end of said bar and bearing against said cylinder head.

7. The device of claim 6, wherein said cylinder head comprises a central recess for partially housing said second nut.

8. The device of claim 6, wherein the outer wall of said cylinder head comprises a vent passage therethrough for permitting escape of the hydraulic fluid of the jack when the piston reaches a predetermined location within the cylinder head, said vent passage being exposed to such hydraulic fluid when the piston reaches said predetermined location, thereby limiting the stroke of said piston.

9. The device of claim 5, wherein said piston has inner and outer peripheries tapered in the form of portions of toric surfaces in a direction away from the face of said piston which receives hydraulic pressure.

10. A method for determining the tension of a prestressing bar with a threaded end projecting from an end face of an element to be pre-stressed, with a jack having a movable part attached to said bar end and a fixed part having one end proximate said element, there being a first bearing plate mounted against said end face and having a first annular spherical cup part, a nut engaged on said threaded end and having a first spherical ball part bearing against said first annular spherical cup part thereby forming a first swivel joint, and there also being a second bearing plate slidably disposed on an outer face of said first bearing plate, said second bearing plate having a second annular spherical cup part, said one end of said fixed part having a second spherical ball part bearing against said second annular spherical cup part of said second bearing plate thereby forming a second swivel joint, comprising the steps of:

applying increasing jack pressure on said bar, thereby increasing the tension therein;

plotting on a diagram a first straight line of increasing jack pressure versus elongation of the bar for that portion of the bar between the nut and the point of attachment of said bar to said movable part of said jack, prior to sufficient tension being imposed in said bar by said jack to draw said nut out of seating relationship with said first annular spherical cup part;

plotting on the same diagram as the first straight line, a second straight line of increasing jack pressure versus elongation of the bar for the entire bar after said nut is drawn by sufficient jack pressure out of seating relationship with said first annular spherical cup part; and determining the value of jack pressure at the intersection of said first and second straight lines, such value corresponding substantially to the tension in said bar.

* * * * *